(12) United States Patent
Backhaus et al.

(10) Patent No.: US 11,599,850 B2
(45) Date of Patent: Mar. 7, 2023

(54) MONITORING OF PRODUCTS

(71) Applicant: Bayer Aktiengesellschaft, Leverkusen (DE)

(72) Inventors: Christof Backhaus, Hückeswagen (DE); Katharina Berger, Weilerswist (DE); Uwe Schenkel, Langenfeld (DE); Jürgen Schmidt, Bad Laasphe (DE); Walter Speth, Pulheim (DE); Klaus Glismann, Cologne (DE); Eric Willms, Cologne (DE); Markus Storz, Leverkusen (DE); Arne Wendt, Burscheid (DE); Gregory James Dibble, Chesterfield, MO (US)

(73) Assignee: BAYER AKTIENGESELLSCHAFT, Leverkusen (DE)

( * ) Notice: Subject to any disclaimer, the term of this patent is extended or adjusted under 35 U.S.C. 154(b) by 50 days.

(21) Appl. No.: 16/964,097

(22) PCT Filed: Jan. 18, 2019

(86) PCT No.: PCT/EP2019/051225
§ 371 (c)(1),
(2) Date: Jul. 22, 2020

(87) PCT Pub. No.: WO2019/145224
PCT Pub. Date: Aug. 1, 2019

(65) Prior Publication Data
US 2021/0035054 A1 Feb. 4, 2021

(30) Foreign Application Priority Data

Jan. 25, 2018 (EP) .................................... 18153356
May 25, 2018 (EP) .................................... 18174305

(51) Int. Cl.
G06Q 10/087 (2023.01)
H04W 4/38 (2018.01)
(Continued)

(52) U.S. Cl.
CPC ....... *G06Q 10/087* (2013.01); *G06K 7/10722* (2013.01); *G06K 7/1417* (2013.01);
(Continued)

(58) Field of Classification Search
CPC ........... G06Q 10/087; G06Q 10/06315; G06Q 30/0623; G06Q 50/04; G06Q 50/28;
(Continued)

(56) References Cited

U.S. PATENT DOCUMENTS

2004/0145474 A1* 7/2004 Schmidtberg .......... G08C 17/04
340/572.1
2010/0021799 A1* 1/2010 Rieke ...................... H01M 6/40
29/623.5
(Continued)

FOREIGN PATENT DOCUMENTS

DE 19516076 A1 11/1996
EP 3104433 A1 12/2016
(Continued)

OTHER PUBLICATIONS

Wikipedia (2018). "Radio-frequency identification" located at https://en.wikipedia.org/w/index.php?title=Radio-frequency_identification&oldid=820978051 last visited May 31, 2018, 19 pages.

*Primary Examiner* — Garcia Ade
(74) *Attorney, Agent, or Firm* — Morrison & Foerster LLP

(57) ABSTRACT

The invention relates to the monitoring of products by means of active radio tags. According to the invention, packagings of products are provided with an active radio tag that detects at least one environmental condition and/or at
(Continued)

least one packaging state, and which emits a signal at time intervals, which provides information about a unique identifier and at least one state in which the respective product is found. The signal is picked up by a receiver that extracts the unique identifier and the state information and transmits same together with location information to an external server.

6 Claims, 5 Drawing Sheets

(51) Int. Cl.
| | |
|---|---|
| *H04W 4/029* | (2018.01) |
| *H04W 4/35* | (2018.01) |
| *H04W 4/80* | (2018.01) |
| *G06K 7/10* | (2006.01) |
| *G06K 7/14* | (2006.01) |
| *G06Q 10/0631* | (2023.01) |
| *G06Q 30/0601* | (2023.01) |
| *G06Q 50/04* | (2012.01) |
| *G06Q 50/28* | (2012.01) |
| *H04L 101/681* | (2022.01) |

(52) U.S. Cl.
CPC ... *G06Q 10/06315* (2013.01); *G06Q 30/0623* (2013.01); *G06Q 50/04* (2013.01); *G06Q 50/28* (2013.01); *H04W 4/029* (2018.02); *H04W 4/35* (2018.02); *H04W 4/38* (2018.02); *H04W 4/80* (2018.02); *H04L 2101/681* (2022.05)

(58) Field of Classification Search
CPC ........... G06Q 10/0833; G06K 7/10722; G06K 7/1417; H04W 4/029; H04W 4/35; H04W 4/38; H04W 4/80; H04L 2101/681
USPC .......................................................... 705/28
See application file for complete search history.

(56) References Cited

U.S. PATENT DOCUMENTS

| | | | | |
|---|---|---|---|---|
| 2010/0081049 | A1* | 4/2010 | Holl | ............... H01M 6/12 29/623.5 |
| 2010/0171586 | A1* | 7/2010 | Park | ............ G06K 19/0723 340/5.1 |
| 2014/0303989 | A1* | 10/2014 | Ferguson | ............... G16H 40/67 705/2 |
| 2016/0012498 | A1* | 1/2016 | Prasad | ............ G06Q 30/0185 705/26.1 |
| 2016/0351936 | A1 | 12/2016 | Cooke | |

FOREIGN PATENT DOCUMENTS

| | | |
|---|---|---|
| KR | 20170085256 A | 7/2017 |
| KR | 20170098004 A | 8/2017 |
| WO | 9604881 A1 | 2/1996 |

* cited by examiner

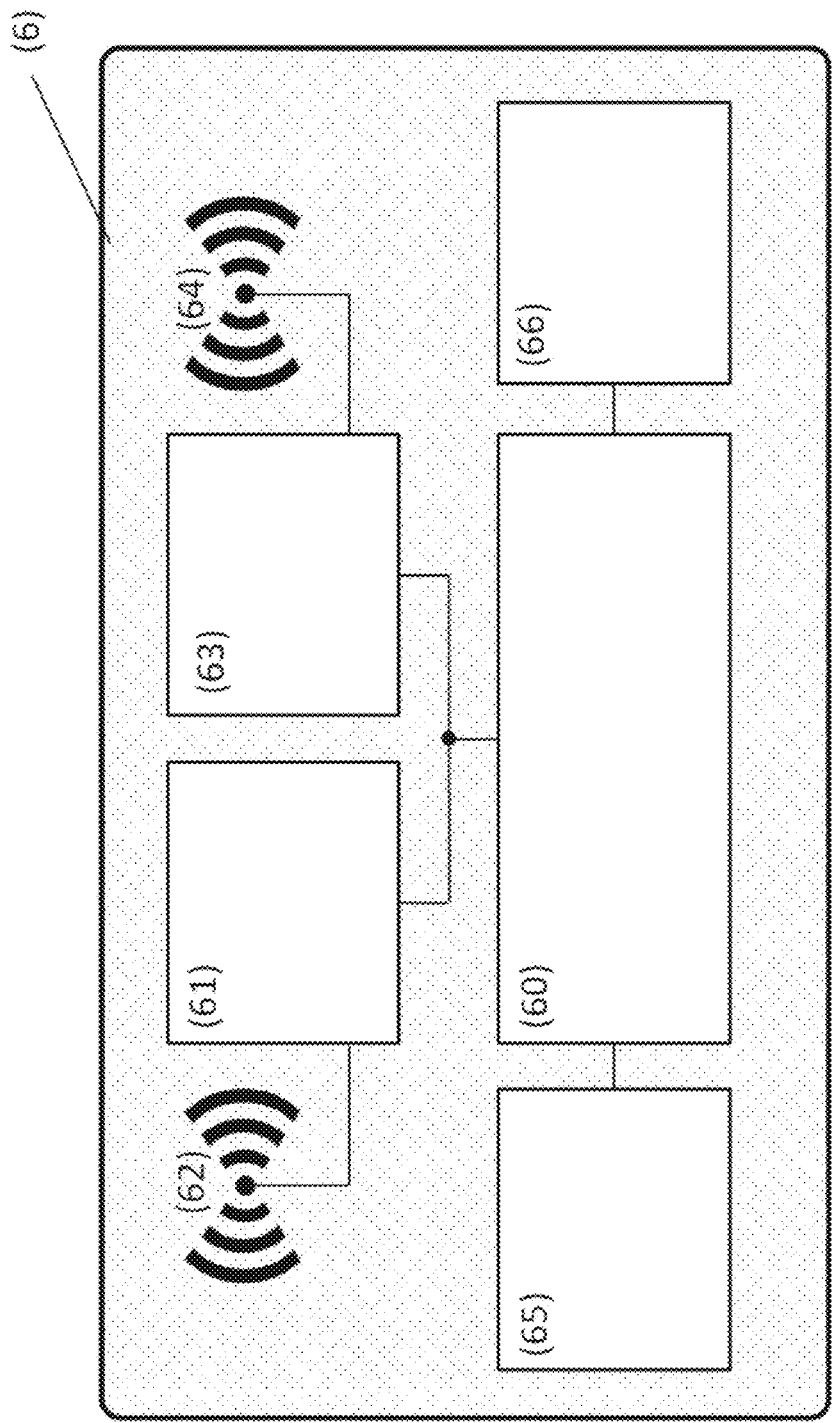

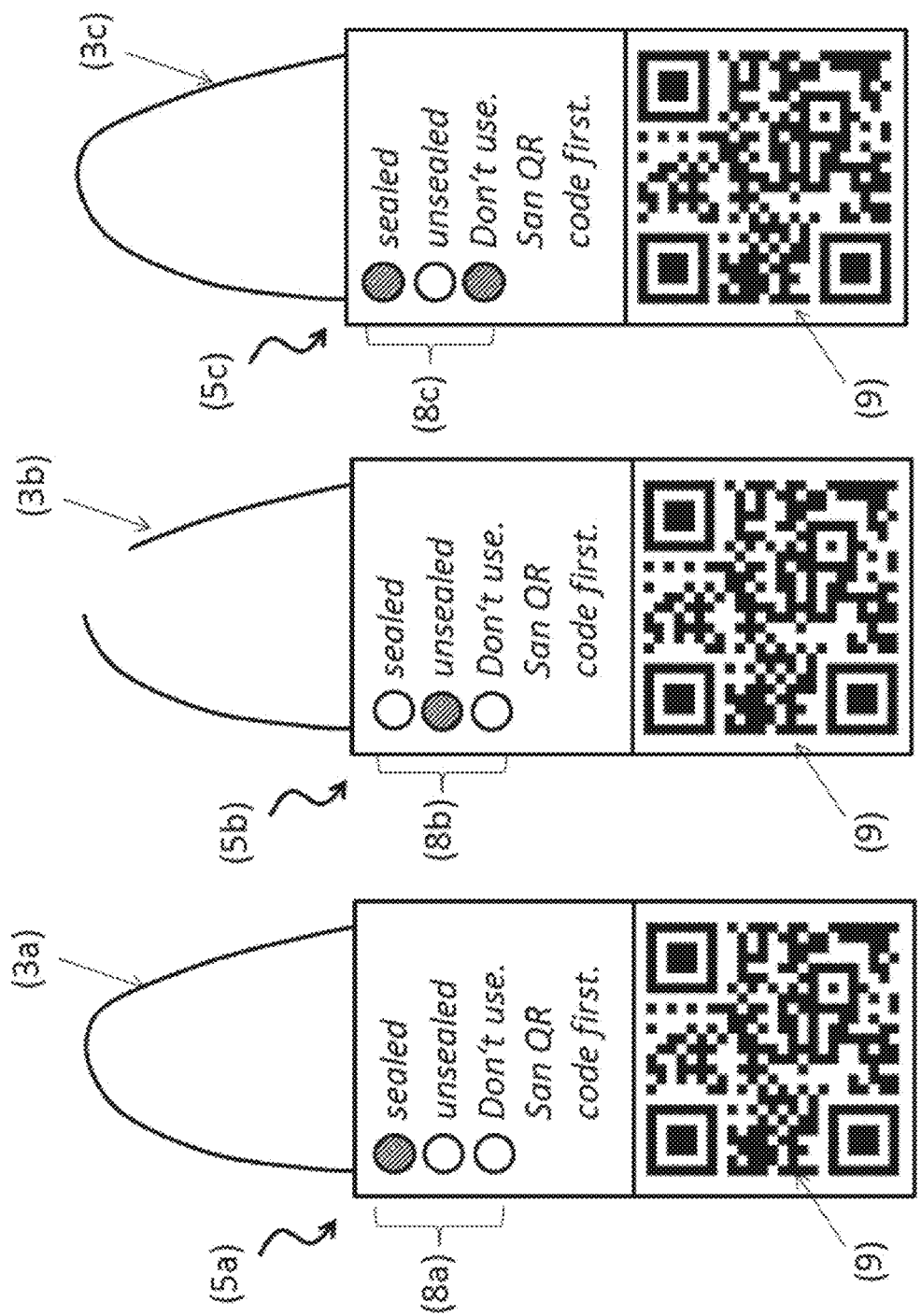

MONITORING OF PRODUCTS

CROSS REFERENCE TO RELATED APPLICATIONS

This application is a national stage application under 35 U.S.C. § 371 of International Application No. PCT/EP2019/051225, filed internationally on Jan. 18, 2019, which claims the benefit of European Application Nos. 18153356.3, filed Jan. 25, 2018, and 18174305.5, filed May 25, 2018, the contents of each of which are herein incorporated by reference in their entireties.

FIELD OF THE DISCLOSURE

The present invention relates generally to monitoring of products using active radio tags.

BACKGROUND

It may be useful or even necessary for a manufacturer and/or distributor of products to monitor the products. Pharmaceutical products and pesticides are subject to a series of official regulations, for example; these include, in some states, the requirement to ensure that the products are traceable (track & trace). For this purpose, individual packagings are provided with a unique identifier (e.g. a serial number) (serialization) in order to be able to clearly identify them at a later time. The unique identifier can be used to clearly place a product that is in one's hands; however, it is not possible to determine the location of a product that has been put into circulation or the state of said product solely on the basis of the unique identifier.

SUMMARY OF THE DISCLOSURE

Monitoring of products can also be of value for optimizing production and/or for logistical purposes. If a user or distributor of consumable products has a large stock inventory, this user/distributor is not likely to order a sizeable amount of new products in the short term. This information can be used for planning the manufacture of products and/or for distributing and/or storing already manufactured products, in order to achieve optimum production machine utilization and/or warehouse utilization and/or transport utilization.

It would therefore be desirable to know where individual products that have been put into circulation are. Furthermore, it would be desirable to know whether a packaging that usually contains a product before it is used has already been opened or is still unopened, since when packagings have been opened it can usually be assumed that the products therein will be used in the foreseeable future and then new products will be needed. It would be desirable to be able to monitor the entire logistical chain—from manufacture through to consumption/use of the product—for example in order to be able to check whether storage conditions have been complied with. It would be desirable to be able to find out the conditions to which products are subject during transport and/or storage.

According to the invention, this is achieved by the subjects of the present invention.

A first subject of the present invention is an active radio tag,
wherein the radio tag is designed such that it can be connected to a packaging of a product,
wherein the radio tag comprises at least one sensor that detects at least one environmental condition and/or at least one packaging state,
wherein the radio tag is configured such that it transmits an advertising data packet at intervals of time,
wherein the advertising data packet comprises a unique identifier and at least one piece of state information pertaining to the at least one environmental condition and/or the at least one packaging state.

A further subject of the present invention is a product comprising a packaging, wherein the packaging is connected to an active radio tag,
wherein the radio tag comprises at least one sensor that detects at least one environmental condition and/or at least one packaging state,
wherein the radio tag is configured such that it transmits an advertising data packet at intervals of time,
wherein the advertising data packet comprises a unique identifier and at least one piece of state information pertaining to the at least one environmental condition and/or the at least one packaging state.

A further subject of the present invention is a receiver comprising
a receiving unit,
a location determination unit,
a data processing unit,
a control unit and
a transmitting unit,
wherein the control unit is configured such that it prompts the receiving unit to listen in on one or more frequency ranges and to receive an advertising data packet that is sent by an active radio tag connected to a packaging of a product,
wherein the control unit is configured such that it prompts the data processing unit to extract from the advertising data packet a unique identifier and one or more pieces of state information,
wherein the control unit is configured such that it prompts the location determination unit to determine location information, and
wherein the control unit is configured such that it prompts the transmitting unit to convey the unique identifier and the (pieces of) state information and the location information via a network to a server.

A further subject of the present invention is a computer program product comprising a program code that is stored on a data carrier and that prompts a computer comprising a receiving unit, a location determination unit, a data processing unit, a control unit having a main memory and a transmitting unit to carry out the following steps when the program code is loaded into the main memory,
listening in on one or more frequency ranges,
receiving an advertising data packet sent by an active radio tag connected to a packaging of a product,
extracting a unique identifier and one or more pieces of state information from the advertising data packet,
determining location information, and
conveying the unique identifier and the (pieces of) state information and the location information via a network to a server.

A further subject of the present invention is a system comprising
at least one active radio tag, and
at least one receiver,
wherein the radio tag is designed such that it can be connected to a packaging of a product, wherein the radio tag comprises at least one sensor that detects at least one environmental condition and/or at least one packaging state, wherein the radio tag is configured such that it transmits an advertising data packet at intervals of time, wherein the advertising data packet comprises a unique identifier and at least one piece of state information pertaining to the at least one environmental condition and/or the at least one packaging state, wherein the receiver is configured such that it determines location information, wherein the receiver is configured such that it listens in on one or more frequency ranges and receives the advertising data packet, wherein the receiver is configured such that it extracts the unique identifier and the at least one piece of state information from the advertising data packet, and wherein the receiver is configured such that it conveys the unique identifier and the at least one piece of state information and the location information via a network to a server.

A further subject of the present invention is a method comprising the steps of connecting an active radio tag to a packaging of a product, detecting at least one environmental condition and/or at least one packaging state by means of the radio tag, sending an advertising data packet by means of the radio tag, wherein the advertising data packet comprises a unique identifier and at least one piece of state information pertaining to the at least one environmental condition and/or the at least one packaging state, listening in on one or more frequency ranges and receiving the advertising data packet by means of a receiver, extracting the unique identifier and the at least one piece of state information from the advertising data packet by means of the receiver, determining location information by means of the receiver, and conveying the unique identifier and the at least one piece of state information and the location information via a network to a server.

The invention is illustrated in more detail below without distinguishing between the subjects of the invention. On the contrary, the illustrations that follow are intended to apply analogously to all subjects of the invention, irrespective of the context in which they occur.

BRIEF DESCRIPTION OF THE DRAWINGS

The present disclosure will now be described, by way of example only, with reference to the accompanying drawings, in which:

FIG. 4 illustrates components of a receiver used to monitor products, according to some embodiments; and FIG. 5 illustrates three radio tags in different states, according to some embodiments.

DETAILED DESCRIPTION

Figure 1:
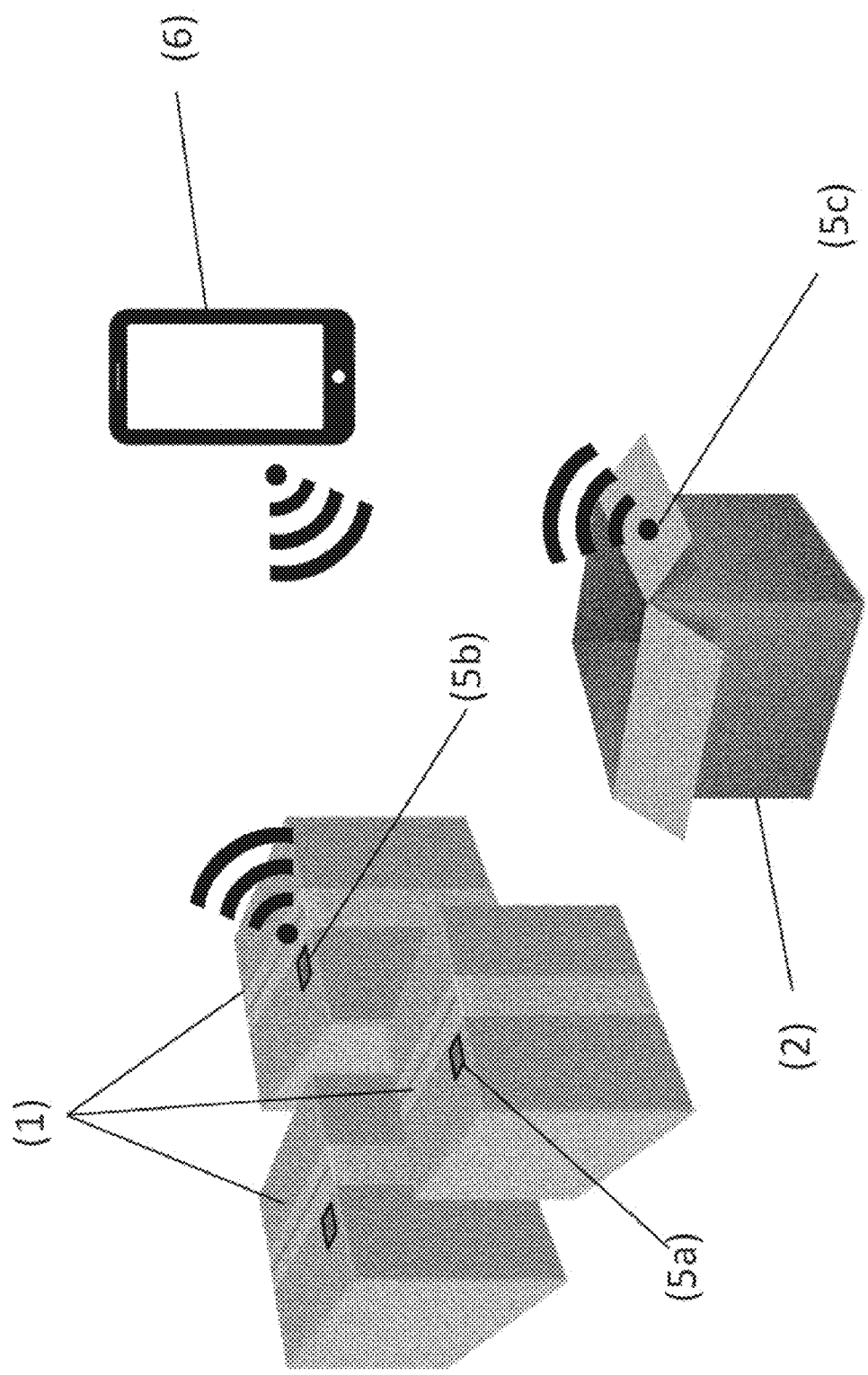
FIG. 1 illustrates a block diagram of a system including a plurality of radio tags and a receiver for monitoring products, according to some embodiments.

When the present description or the patent claims mention(s) steps in an order, this does not necessarily mean that the invention is restricted to the order mentioned. On the contrary, it is conceivable for the steps to be carried out in a different order as well or in parallel with one another as well, unless one step builds on another step, this making it absolutely necessary for the building step to be carried out subsequently (something which is made clear in each individual case, however). The orders mentioned are thus preferred embodiments of the invention.

According to the present invention, packagings of products are equipped with an active radio tag.

The product can be any item (a material good) that can be offered commercially and sold.

Preferably, the product is a consumable article or a consumable material that is used by a user (end customer) for a defined purpose and "consumed" in the process, i.e. transferred to a state in which it can no longer be used for the original purpose, so that the user needs to purchase a new product. Preferably, it is a product that is not intended for immediate use by a user, but rather can be stored for a certain time before it is used. The storage time is preferably at least several weeks to several years.

Examples of products within the context of the present invention are medicaments, pesticides, cosmetics, cleaning agents and the like. Preferably, the product is a pesticide (e.g. a herbicide, an insecticide or a fungicide).

The product is in a packaging. The packaging can be used to put the product into a transportable state and/or to protect it from environmental influences that can damage the product (e.g. dampness, atmospheric oxygen, light and the like).

Examples of packagings are cardboard boxes (cardboard packaging), blister packs, canisters, bottles, sacks, bags, containers and the like.

The packaging is equipped with an active radio tag. The term "active radio tag" means that the radio tag has means for supplying power.

Ordinarily, the radio tag is connected to the packaging after the packaging has been filled with the product and sealed. Alternatively, it is conceivable for the radio tag to be connected to the packaging before the product is put into the packaging and/or the packaging is sealed.

It is also conceivable for the radio tag to be part of the packaging.

For example the radio tag can be printed on the packaging or be joined (e.g. laminated) to the packaging to produce a combination.

The radio tag can be situated outside the packaging—this is the region of the packaging that has no contact with the product but is in contact with the outside world (environment). The radio tag can alternatively be situated inside the packaging—this is the region of the packaging that is in contact with the product. It is also conceivable for the radio tag to be introduced between two packagings.

The radio tag can be mounted/introduced on or in a closure of the packaging (e.g. on or in a screw closure).

In one embodiment of the present invention, the radio tag, as soon as it has been connected to the packaging, is irreversibly connected to the packaging, i.e. an attempt to remove the radio tag from the packaging would lead to destruction of the radio tag, "destruction of the radio tag" meaning that the radio tag is no longer usable according to the invention. Such an irreversible connection can be achieved for example by means of an adhesively bonded joint between the radio tag and the packaging, the force for overcoming the adhesively bonded joint and hence for detaching the radio tag from the packaging being greater than the force holding individual components of the radio tag together, so that an attempt at detachment leads to individual components of the radio tag being separated from one another and hence the radio tag being destroyed.

In another embodiment of the present invention, the radio tag is embodied such that it can be reused. It can thus be detached from the packaging again and connected to another packaging.

The radio tag has at least one sensor. A "sensor" is a technical assembly that can detect specific physical or chemical properties and/or the material composition of its surroundings qualitatively or, as a measured variable, quantitatively. The properties are detected by means of physical or chemical effects and transformed into for the most part electrical signals that are processable further. Before the electrical signals are conveyed by radio to a receiver, they are normally also digitized.

The at least one sensor captures measured values that characterize the state of the packaging and/or of the product at the time of the measured value capture. The at least one sensor is thus used to generate state information.

Such a state can be one or more environmental conditions to which the packaging/product is/was subject ("external parameter"), and/or a packaging state ("internal parameter").

Environmental conditions are for example temperature, air pressure, humidity, intensity of electromagnetic radiation in a defined wavelength range, acceleration forces to which the sensor is exposed, and the like. Environmental conditions are detected at the time and at the location at which they prevail. If an environmental condition is detected at a time by a sensor, the sensor (or the product) is subject to this environmental condition at this time.

Packaging states characterize the packaging. They involve in particular environmental conditions to which the packaging was exposed at an earlier time. Packaging states are for example: the packaging is opened or unopened, the packaging was crushed or not crushed, the packaging was exposed to a temperature that is above and/or below a defined temperature limit value, the packaging was exposed to a dampness (humidity) that is above a defined dampness limit value, the packaging was exposed to a pressure that is below and/or above a defined pressure limit value, the packaging was exposed to acceleration forces that are above a defined acceleration limit value, and the like. A packaging state denotes environmental conditions to which a packaging was exposed before the time of detection of the respective packaging state. Normally, packaging states are detected by using sensors in which a component is irreversibly altered by environmental conditions above and/or below defined limit values. Such a component is also referred to as an indicator below. The indicator thus indicates whether the indicator was exposed to a defined environmental condition.

The aim of the detection of environmental conditions and/or packaging states can be to track whether in the distribution chain—from manufacture through to the end user—the transport and/or storage conditions required for the product have always been complied with. The aim of the detection of environmental conditions and/or packaging states can also be to monitor the transport and/or the storage conditions so that it is always known where a specific product currently is and/or what state it is currently in.

It is conceivable for the product to need to be cooled so that it does not spoil. In such a case, a temperature sensor can detect the temperature at defined times. If a measured temperature value is above a defined temperature limit, it is obvious that the cooling chain is currently not being complied with. It is alternatively possible to use a sensor that comprises a temperature indicator that is irreversibly altered by a temperature above a defined limit value. During detection, the sensor checks whether the temperature indicator has changed (because the temperature was above the defined limit value in the past) or whether it has not changed.

It is conceivable that the product is not frostproof and hence should not be exposed to a temperature below a temperature limit value. In such a case, a temperature sensor can detect the temperature at defined times. If a measured temperature value is below a defined temperature limit, it is obvious that the product was exposed to low temperatures and could have been damaged. It is alternatively possible to use a sensor that comprises a temperature indicator that is irreversibly altered by a temperature below a defined limit value. During detection, the sensor checks whether the temperature indicator has changed (because the temperature was below the defined limit value in the past) or whether it has not changed.

It is conceivable that the product must not become damp because otherwise it is damaged or there is the fear of losses of quality; in such a case, a moisture sensor can detect the dampness (e g humidity) at defined times. If a measured dampness value is above a defined limit value, it is obvious that the current dampness is too high and measures to reduce the dampness should be taken. It is alternatively possible to use a sensor that comprises a dampness indicator that is irreversibly altered by a dampness above a defined limit value. During detection, the sensor checks whether the dampness indicator has changed (because the dampness was above the defined limit value in the past) or whether it has not changed.

It is conceivable that a product is sensitive to acceleration forces, for example because it is fragile. In such a case, an acceleration sensor can detect the acceleration forces at defined times. If a measured value for the acceleration forces currently acting on a sensor is above a defined limit value, it is obvious that there is a danger of the product being damaged. It is alternatively possible to use a sensor that comprises an acceleration indicator that is irreversibly altered by acceleration forces above a defined limit value. During detection, the sensor checks whether the acceleration indicator has changed (because the acceleration forces were above the defined limit value in the past) or whether it has not changed.

It is conceivable that a product is photosensitive. In such a case, a light intensity sensor can detect the intensity of electromagnetic radiation in a defined wavelength range (e.g. in the range of visible light (380 nm to 780 nm) and/or in the range of ultraviolet light (e.g. UV-A (380 nm to 315 nm) and/or UV-B (315 nm to 280 nm) or another wavelength range or multiple wavelength ranges) at defined times. If a measured value for the light intensity currently acting on the sensor is above a defined limit value, it is obvious that the product is currently exposed to an excessively high light intensity; measures to reduce the light intensity should be taken. It is alternatively possible to use a sensor that comprises a light indicator that is irreversibly altered by a light intensity above a defined limit value. During detection, the sensor checks whether the light indicator has changed (because the light intensity was above the defined limit value in the past) or whether it has not changed.

To measure temperature, dampness, pressure, acceleration, light intensity and other environmental conditions, there are a multiplicity of commercially available sensors and indicators.

Environmental conditions can be detected by using one or more sensors at defined times. "Defined time" means that the time at which a measured value capture takes place follows clear rules. By way of example, it is conceivable for a measured value capture to take place at previously stipulated times, such as e.g. once a day at 12 o'clock midday, or every hour or the like. A "defined time" is alternatively supposed to be understood to mean the occurrence of a defined event that triggers a measured value capture, such as for example an external (electromagnetic) impulse, a vibration and the like. It is conceivable for the measured value capture and the sending of advertising data packets to be coupled to one another, for example such that before an advertising data packet is sent a measured value capture is prompted and the captured measured value(s) is/are then sent in the form of the advertising data packet. A decoupling is alternatively conceivable; for this case, the radio tag has a data memory in which measured values can be stored. Measured values are captured at defined times and stored in the data memory. Before an advertising data packet is sent, a control unit that is part of the radio tag determines the environmental condition on the basis of the stored measured values and then sends the information about the environmental condition in the form of the advertising data packet.

The same applies to the determination and sending of one or more packaging states. The capture of measured values for determining a packaging state takes place at defined times and may be coupled to or decoupled from the sending of an advertising data packet. It is conceivable for measured values to be captured immediately before an advertising data packet is sent; it is conceivable for measured values to be captured and stored in a data memory.

In a preferred embodiment, the radio tag comprises a sensor that detects whether the packaging is unopened or whether it is opened/has been opened.

The sensor detects the packaging state (unopened/opened) preferably on the basis of a physical property that changes if the packaging has been opened and/or is being opened. The physical property that changes as a result of the packaging being opened can be for example an electrical conductivity (or an electrical resistance) and/or an electrical capacitance and/or an inductance or the like.

It is conceivable for the sensor to be designed such that it checks at defined intervals of time whether the packaging is opened or unopened.

In one embodiment of the present invention, the radio tag has one or more electrically conductive wires that are mounted such that opening the packaging results in at least one wire being irreversibly broken, so that no further electric current can flow through this wire. The sensor detects a broken wire on account of the conductivity having changed. This principle is described in WO9604881A1 or DE19516076A1, for example. The wire in the present case acts as an indicator; opening the packaging leads to an irreversible alteration of the indicator: the wire is broken.

It is conceivable for the sensor to be designed such that it detects the process of opening the packaging. The change of state (unopened→opened) can be detected by sensor on the basis of the piezoelectric effect, for example: opening the packaging leads to a mechanical stress on a piezo element, as a result of which a voltage builds up. This voltage or the effect thereof can be registered by a sensor.

The radio tag can have a data memory in which the information about the packaging state is stored. It is conceivable for the sensor to be designed such that it checks at defined intervals of time whether the packaging is still unopened; as soon as it is opened, the applicable (new) packaging state is stored in a data memory. Before the radio tag sends the packaging state in the form of advertising data, a control unit that is part of the radio tag reads the packaging state from the data memory. The detection of the packaging state and the sending of the state information are decoupled in such a case. The radio tag can be configured such that it requests the packaging state by means of a sensor at defined times until the sensor registers that the packaging is being/has been opened. Thereafter, no further request of the packaging state by means of a sensor is required.

The radio tag also has a unique identifier. The unique identifier can be a number or an alphanumeric code or a binary code or the like. The unique identifier is used to identify the radio tag or to identify the product to which the radio tag is connected via the packaging. Normally, a product database is part of the system according to the invention. The unique identifier can be used to request information (product name, product type, manufacturer, batch number, date of manufacture, composition, instructions the use, expiry date, best before date and the like) about the respective product from the database.

The identifier is stored in a data memory of the radio tag. Preferably, this is a semiconductor memory. It can be the same data memory as that in which the packaging state information and/or measured values pertaining to environmental conditions can also be stored; it can alternatively be a separate data memory. The data memory for the unique identifier is normally a WORM memory (WORM: write once, read many). It is conceivable for the radio tag to already have a unique identifier before connection to the packaging. It is alternatively conceivable for the unique identifier to be written into the data memory only after the radio tag is connected to the packaging. A control unit of the radio tag can access the data memory and read the unique identifier. The control unit can send the unique identifier by means of a transmitting unit of the radio tag.

The unique identifier is stored both in a data memory of the radio tag and in a separate product data memory, so that the unique identifier and the product are related to one another and, if the unique identifier is known, information pertaining to the product can be obtained from the product database.

In a preferred embodiment, the radio tag has an optically readable code, such as e.g. a barcode or a matrix code (such as e.g. QR code or data matrix code). The optically readable code comprises a unique identifier, on the basis of which the radio tag and/or the product and/or a product batch and/or the like can be clearly identified. This can be the same unique identifier as that which the control unit of the radio tag can access. It can alternatively be a different (further) unique identifier. The optical code can also comprise an Internet address. The optically readable code is for example printed on the radio tag, engraved, etched, put on the radio tag in the form of a sticker or otherwise connected to the radio tag or introduced into the radio tag.

The optical code is used to make further information about the product available to the purchaser/user of the product. This is accomplished for example by virtue of the purchaser/user using a mobile computer system such as for example a smartphone or a tablet computer to read the optically readable code into the mobile computer system. Normally, mobile computer systems have a camera that can be used to read optical codes. Preferably, the mobile computer system is configured (by an installed software program (an "app")) to take the read-in optical code as a basis for opening an Internet page on which information pertaining to the product is presented to the purchaser/user. This can be information intended specifically for the purchaser/user of this product. It is conceivable for example to present a communication pertaining to a recall for the product or information about what needs to be done if the product was exposed to defined environmental conditions that can mean a loss of quality. Preferably, the mobile computer system is the receiver according to the invention.

In a preferred embodiment, the purchaser/user receives via the radio tag a communication to the effect that he is supposed to read in the optical code and hence set up access to an Internet page containing information that has been provided for him. It is conceivable for example for the radio tag to have a status indicator that communicates to him whether the packaging of the product is closed (e.g. sealed), whether it is opened and usable or whether he is supposed to retrieve further information from the Internet page that he gets to via the optical code before using the product. The status indicator can be for example one or more light-emitting diodes (LEDs) or a liquid crystal display (LCD). It is conceivable for the control unit of the radio tag to be configured such that it changes the information indicated by means of the status indicator if the measured values captured by means of one or more sensors assume or reach defined values. By way of example, the status indicator can indicate that the packaging is properly sealed if the packaging state sensor registers that the packaging is sealed. The status indicator can indicate that the packaging is opened if the packaging state sensor registers that the packaging is (has been) opened. The status indicator can indicate that the product was exposed to harmful environmental conditions (an excessively high temperature, an excessively low temperature, an excessively high humidity, an excessively high pressure, an excessively high acceleration and the like) if a sensor registers that a limit value (temperature, humidity, pressure, acceleration force, etc.) is (has been) transgressed (warning signal). The purchaser/user is advised by such a warning signal that there may be something wrong with the product and he should retrieve information via the Internet page before use. It is also conceivable for the radio tag to have a receiving unit by means of which the radio tag can receive a signal. In this manner, it is for example possible to change the status indicator by means of an external signal, for example in order to recall a product.

The radio tag has means for supplying power.

These can be for example a battery or a storage battery. In a preferred embodiment, the means for supplying power are a printable battery as in exemplary fashion in US2010021799A, EP3104433A1, KR20170085256A, KR20170098004A and US2010081049A. Preferably, the battery is biologically degradable (see e.g. US2016351936A).

The radio tag can furthermore be designed such that it obtains electric power from the surroundings of the radio tag. The electric power is used for supplying electricity to the radio tag so that it can perform its functions according to the invention. The energy from the surroundings can be provided for example in the form of light, electric fields, magnetic fields, electromagnetic fields, motion, pressure and/or heat and/or other forms of energy and used or "harvested" by the radio tag. This type of electric power generation is known as Energy Harvesting. Energy Harvesting in the field of electronics refers to methods that can be used to obtain and store extremely small amounts of freely available energy from the surroundings. This technique allows radio tags to be supplied with energy throughout their life, so that they do not need to be maintained again following installation. Energy Harvesting systems normally comprise an energy transducer, an energy management unit having an energy store, which is usually a capacitor. The energy transducer, also called a micro generator, converts energy from the surroundings into electric power. The conversion can involve the use of the piezoelectric effect, the thermoelectric effect or the photoelectric effect, for example. Further details are described in the prior art (see e.g. http://www.harvesting-energy.de/ and the publications listed therein).

The radio tag is furthermore designed such that it can send an advertising data packet, also called a "beacon". The advertising data packet comprises the unique identifier and at least one piece of state information pertaining to the at least one detected environmental condition and/or the at least one detected packaging state.

The advertising data packet can be an advertising data packet borrowed from the Bluetooth standard. Bluetooth is an industrial standard according to IEEE 802.15.1 that was developed in the 1990s by the Bluetooth Special Interest Group (SIG) for data transmission between devices over a short distance using radio technology (WPAN). Devices based on the standards of the Bluetooth SIG transmit as short-range devices (SRD) in a license-free ISM band (Industrial, Scientific and Medical Band) between 2.402 GHz and 2.480 GHz. A subform of Bluetooth is Bluetooth Low Energy, Bluetooth LE or BLE for short, requiring a lower power consumption than conventional Bluetooth. Bluetooth LE in particular divides the ISM frequency band into 40 channels having a width of 2 MHz. Conventionally, Bluetooth LE transponders independently of one another transmit short advertising data packets on one of three advertising channels. The advertising channels are in the ISM frequency band, typically two at the edges of the band and one in the middle of the band. In particular, channels 37, 38 and 39 can be used as the advertising channels on which the advertising signals/data packets are transmitted. Normally, a Bluetooth LE transponder subsequently listens on this channel for a connection request, whereupon a change is then made to one of the remaining 37 channels in order to perform a data interchange with one. The advertising channels are thus broadcast channels that can be used to transmit data packets from a source to all available or "listening" subscribers of the Bluetooth communication network. Advertising data packets (broadcast data packets) can be transmitted at regular intervals, i.e. periodically, on every advertising channel. A time interval between successive advertising data packets can comprise both a fixed interval and an additional random delay. A standard advertising data packet comprises a payload of no more than 31 bytes for data describing the transmitter and its capabilities. It is therefore also possible for arbitrary user-defined information to be transmitted to other devices. If the standard 31-byte payload is not large enough for the data, BLE also supports an optional secondary advertising payload.

According to the invention, no Bluetooth connection is thus set up between the radio tag and a receiver in order to transmit data, since such a connection would cost too much energy. Instead, just the advertising data packet transmitted by the radio tag is picked up by the receiver. Said data packet contains both at least one piece of state information and the unique identifier. The receiver is configured such that it intercepts the advertising data packet and extracts the at least one piece of state information and the unique identifier from the signal. The 31-byte size of a standard advertising data packet is sufficient, in principle, to transmit the at least one piece of state information and the unique identifier from the radio tag to the receiver.

As an alternative to the Bluetooth standard, the advertising data packet can also be sent by means of a communication based on the WiFi standard (IEEE 802.11). IEEE 802.11 is a family of standards for wireless local area networks (WLAN). Based on the 802.11 standard of the Institute of Electrical and Electronics Engineers, service set denotes all devices in a WLAN. A service set identifier (SSID) is a freely selectable name for a service set that renders it addressable. Since this identifier often needs to be input into devices manually by a user, it is often a character string that is easily readable by human beings, and it is therefore generally referred to as the network name of the WLAN. An SSID can have a length of up to 32 bytes. The radio tag according to the invention may thus be configured to use radio to send an SSID data packet comprising the at least one piece of state information and the unique identifier. The receiver according to the invention may thus be configured such that it receives the SSID data packet and extracts the at least one piece of state information and the unique identifier.

It is likewise conceivable for the at least one piece of state information and the unique identifier to be transmitted from the radio tag to the receiver by means of a PAN ID of a ZigBee network.

It is likewise conceivable for the at least one piece of state information and the unique identifier to be transmitted from the radio tag to the receiver via a low-power wide area network (LPWAN or LPN) such as for example a narrowband IoT network.

It is likewise conceivable for the radio tag according to the invention to be oriented as a short-range radio (short-range device, SRD) for sending data via a radio network such as for example the Sigfox radio network. Sigfox is a French telecommunications company that sets up a separate global radio network in order to wirelessly connect objects having a low power requirement to the Internet. The devices transmit small volumes of data at stipulated intervals to a base station, which then forwards them to a database of the respective receiver. Sigfox uses a radio system based on ultra-narrowband technology. It is referred to as a low-power wide area network (LPWAN). LPWAN uses a long-haul signal in the ISM band (868 megahertz in Europe, 902 megahertz in the USA), which can even penetrate solid objects. In open terrain, distances of 30 to 50 km are spannable, and in cities it is between 3 and 10 km. Sigfox base stations are currently able to manage up to one million objects, with one thousandth of the energy of standard mobile radio systems being needed. According to their own statement, Sigfox devices can operate for up to 20 years on just two AA batteries, because they only become active when they transmit a message and then return directly to the idle state again. Devices in the Sigfox network moreover use low data rates. They can send a maximum of 12 bytes per message and at the same time no more than 140 messages per device and day. This capacity is sufficient for transmitting simple messages such as the packaging state information and the unique identifier, however.

Radio tags and receivers are preferably matched to one another in order to consume as little energy as possible for transmitting the data from the radio tag to the receiver. The radio tag is preferably configured such that it is in an idle mode for most of the time. At defined times, it becomes active and sends the advertising data packet comprising the at least one piece of state information and the unique identifier. It is conceivable for the radio tag to send the advertising data packet at regular or irregular times. It is conceivable for it to send the advertising data packet over a defined period or repeatedly as soon as it becomes active. It is conceivable for it to be activated by an event and then to send the advertising data packet one or more times. The event can be triggered by environmental conditions and/or by the receiver and/or by the user of the product.

An advertising data packet can be sent once an hour or once a day or irregularly, for example.

The receiver can be configured such that it is permanently in a receiving node in which it searches defined frequency ranges for an advertising data packet. If it detects an advertising data packet, it extracts the at least one piece of state information and the unique identifier from this signal. The receiver can recognize an advertising data packet from a defined structure of the data contained and/or from a defined bit sequence, for example.

It is also conceivable for the receiver to switch to a receiving node only at defined times and/or within defined periods and to wait for the arrival of one or more advertising data packets. By way of example, it is conceivable for the receiver and/or the radio tag to be put into an active state by external environmental influences that result in the radio tag sending one or more advertising data packets and/or in the receiver searching one or more defined frequency ranges for the one or more advertising data packets. By way of example, it could be that the receiver and/or the radio tag are activated by light when a minimum brightness is reached and/or by heat when a minimum temperature is reached.

In a preferred embodiment, the radio tag is activated by the receiver. By way of example, it is conceivable for the receiver to transmit a signal to the radio tag, wherein the signal activates the radio tag and asks it to transmit the advertising data packet. It is also conceivable for the receiver to provide energy, for example in the form of electromagnetic energy, that is "harvested" by the radio tag and changes the radio tag from the idle mode to an active mode.

Similarly, the radio tag can be activated by the opening of the packaging. By way of example, it is conceivable for the process of opening to provide energy, for example in the form of mechanical energy, that is "harvested" by the radio tag and changes the radio tag from the idle mode to an active mode.

The receiver according to the invention can be a stationary device, that is to say one installed permanently at one location, or a mobile (transportable) device. Preferably, it is a mobile device. The receiver has a receiving unit, a location determination unit, a data processing unit, a control unit and a transmitting unit.

The control unit is used for controlling the individual components of the receiver and for coordinating the flows of data and signals between the components and the flows of data and signals between the receiver and further devices, such as for example the radio tag.

The control unit is configured such that it prompts the receiving unit to check whether a radio tag close to the receiver sends an advertising data packet. If such an advertising data packet is received by the receiving unit, it is conveyed to the data processing unit. The data processing unit is prompted to extract from the advertising data packet the unique identifier and the at least one piece of state information.

The location determination unit can be used by the receiver to determine the position at which it is located. By way of example, the receiver can have a sensor that receives a signal from a satellite navigation system and uses this to find its position. Known satellite navigation systems are for example NAVSTAR GPS, GLONASS, Galileo or Beidou. Since the abbreviation GPS (global positioning system) has become established in colloquial language as a generic name for all satellite navigation systems, the term GPS is used in this description as a collective term for all positioning systems. The location information can furthermore be derived from the (mobile) radio cell in which the receiver is located. The purpose of location determination is not so much determining the location of the receiver, however, as detecting where a specific product currently is. Since a radio tag has only a comparatively short range, however, it is normally sufficient to know the location of the receiver at a time at which it was able to receive an advertising data packet from a radio tag. The location of the radio tag then roughly corresponds to the location of the receiver. Preferably, the receiver therefore performs location determination whenever it has received an advertising data packet from a radio tag, and links the information extracted from the advertising data packet (state information and unique identifier) to the determined location information. It is also conceivable for multiple receivers to receive a transmitted advertising data packet and to determine the location of the radio tag by means of triangulation.

The receiver can use the transmitting unit to convey data to further devices. Preferably, the receiver is connected via a network, such as for example a mobile radio network and/or the Internet, to one or more servers to which it can convey data. The control unit is configured such that it prompts the transmitting unit to convey the unique identifier and the at least one piece of state information and the location information via a network to a server. The information can be conveyed immediately after it is determined; it is alternatively conceivable for the receiver to first store the determined information in an internal data memory and to convey it to an external server only at a later time. Information can be conveyed to a server at regular times, for example once a day or once an hour or every 5 minutes or the like, or irregularly. It is also conceivable for the server to retrieve information from the receiver.

The server receives the unique identifier and the at least one piece of state information and the location information and stores the information in a database pertaining to the respective product with which the unique identifier is associated. The database therefore holds the information concerning where a specific product (product unit) has been at different times and/or where it is currently and/or what state it has been in and/or what state it is in and the like in retrievable fashion. From the stored data, it is accordingly possible, in principle, to determine the entire history of a product from the process of packaging through to the time at which it is removed from the packaging.

The receiver can be a computer system such as for example a laptop computer, a tablet computer or a smartphone. The aforementioned computer systems normally have the aforementioned functions; they are widely available, transportable and can be configured according to the invention by using software programs (apps).

The subject of the present invention is also a computer program product that configures a receiver accordingly in order to carry out steps of the method according to the invention:
  listening in on one or more frequency ranges and receiving an advertising data packet,
  extracting a unique identifier and at least one piece of state information from the advertising data packet,
  determining location information, and
  conveying the unique identifier and the at least one piece of state information and the location information via a network to a server.

Preferably, the computer program product according to the invention is available as an app via a download portal, from which it can be loaded onto a receiver according to the invention and installed there.

Preferably, a multiplicity of radio tags and receivers are parts of the system according to the invention, so that, for a multiplicity of product units, it is known where they are and what state they are in. On the basis of this information, production processes and/or logistics and/or warehousing can be optimized.

In one embodiment of the present invention, the manufacturer of the products has access to the server and uses the information in order to optimize manufacture of the products by initiating the manufacture of products when the number of unopened packagings that are with end customers falls below a defined threshold value, for example.

In one embodiment of the present invention, a distributor of the products has access to the server and uses the information to order new products, and/or to transport them to a defined store, when the number of unopened packagings that are with end customers falls below a defined threshold value.

The invention is illustrated in more detail below on the basis of figures and examples without wishing to restrict the invention to the features and combinations of features cited in the figures and examples.

In the figures:

FIG. 1 schematically shows an example of a system according to the invention comprising a plurality of radio tags (5a, 5b, 5c) and a receiver (6). The receiver (6) is embodied as a smartphone. The radio tags (5a, 5b, 5c) have been put on packagings (1, 2) that contain products (not shown). Three packagings (1) are in the unopened state; one packaging (2) is in the opened state. In the figure, radio symbols indicate that two radio tags (5b, 5c) each send an advertising data packet. The advertising data packets are received by the receiver (6). The advertising data packets each contain a unique identifier and also information about whether the respective packaging is opened (5c) or unopened (5b) (not shown in the figure).

Figure 2:
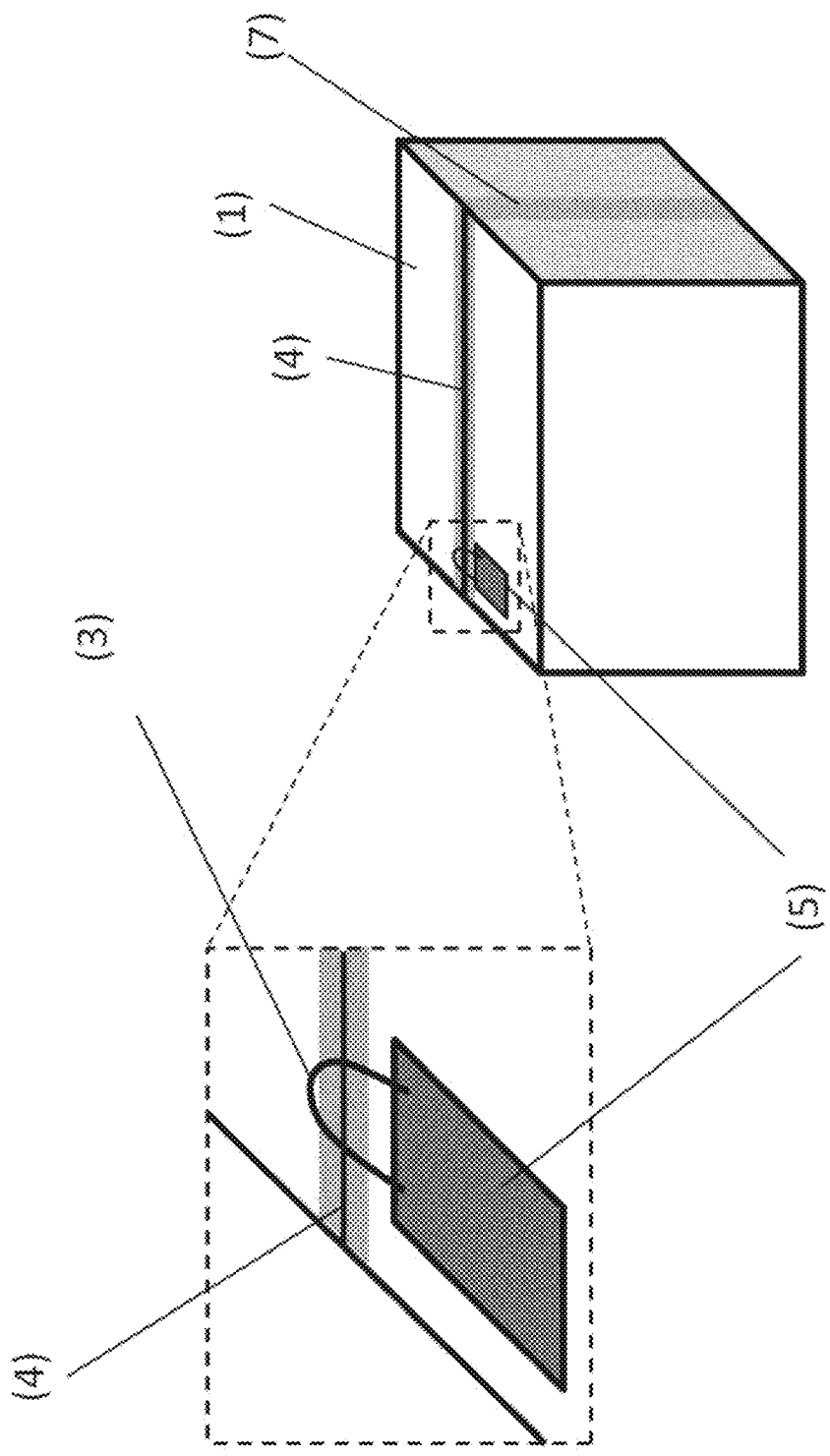
FIG. 2 illustrates a radio tag that has been put on a packaging for a product, according to some embodiments.

FIG. 2 schematically shows an example of a radio tag (5) that has been put on a packaging (1) for a product. The packaging (1) is sealed by means of an adhesive strip (7). If one were to remove the adhesive strip (7) or cut along the line (4), an electrically conductive wire (3) that is part of the radio tag (5) would be broken. The radio tag (5) can be set up such that it detects the breakage of the wire (3) and can therefore decide whether the packaging (1) is unopened or opened.

Figure 3:
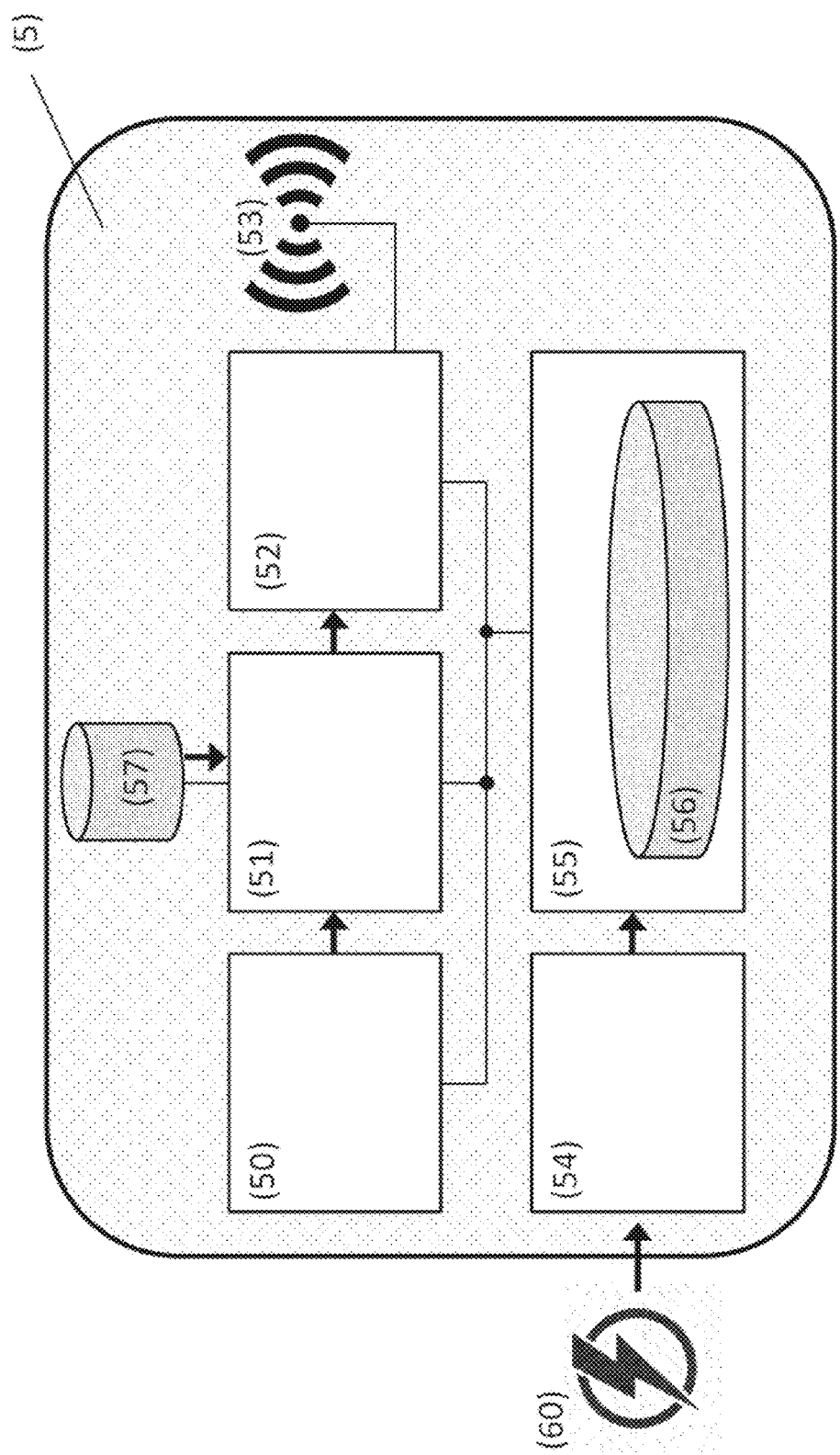
FIG. 3 illustrates components of a radio tag used to monitor products, according to some embodiments.

FIG. 3 schematically shows an example of a radio tag (5). The radio tag (5) has an energy transducer (54) that can use ("harvest") energy (60) from the environment, e.g. an induction coil. The radio tag (5) further has an energy management unit (55) that comprises an energy store (56), for example a capacitor. A sensor (50) is used for detecting the packaging state (opened/unopened). A control unit (51) is used for controlling the individual components and coordinating the flows of data and signals. A transmitting unit (52, 53) can be used to send advertising data packets. A data memory (57) stores the unique identifier and optionally the packaging state information.

FIG. 4 schematically shows an example of a receiver (6). The receiver (6) has a receiving unit (61, 62) that can be used to receive advertising data packets. A control unit (60) is used for controlling the individual components and coordinating the flows of data and signals. A location determination unit (65) can be used to determine the location at which the receiver (6) is (location information). A data processing unit (66) is used for extracting data (unique identifier and packaging state information) from a received advertising data packet and for linking the extracted data to the location information. A transmitting unit (63, 64) can be used to convey the determined data (unique identifier and packaging state information and location information) via a network to a server (not shown).

FIG. 5 shows three radio tags (5a, 5b, 5c) in different states in exemplary fashion. Each of the radio tags (5a, 5b, 5c) has a conductive wire (3a, 3b, 3c), a status indicator (8a, 8b, 8c) and an optically readable code (9).

In the case of the radio tag (5a), the conductive wire (3a) is intact. A control unit (not shown) of the radio tag uses a sensor (not shown) to detect the conductivity of the wire (3a) and detects that the wire (3a) is intact. The control unit prompts the status indicator (8a) to indicate that the packaging is sealed ("sealed"). This indication is provided by means of a light-emitting diode or a liquid crystal display, for example.

In the case of the radio tag (5b), the conductive wire (3b) is broken. The control unit uses the conductivity sensor to detect that the wire (3b) is broken and prompts the status indicator (8b) to indicate that the packaging is opened ("unsealed").

In the case of the radio tag (5c), the conductive wire (3c) is intact. The control unit uses the conductivity sensor to detect that the wire (3c) is intact and prompts the status indicator (8c) to indicate that the packaging is sealed ("sealed"). At the same time, the status indicator (8c) is used to indicate that the purchaser/user should not use the product but rather should first read in the optical code (9). The optical code takes the purchaser/user to an Internet page that provides him with further information.

The invention claimed is:

1. An active radio tag for monitoring a product, the active radio tag comprising:
one or more product state sensors;
a transmitter for wirelessly transmitting data from the active radio tag to a remote receiver; and
a power supply configured to power the one or more product state sensors and the transmitter; and
one or more processors coupled to the one or more product state sensors and the transmitter and configured to cause the active radio tag to:
detect, using the one or more product state sensors, one or more of: an environmental condition associated with an environment to which the product is subject, and a packaging state of a packaging of the product, and
transmit, at intervals of time using the transmitter, an advertising data packet to the remote receiver, wherein the advertising data packet comprises a unique identifier for the active radio tag and product state information associated with the detected environmental condition or the detected packaging state;
wherein the active radio tag is configured to be connected to the packaging of the product.

2. The radio tag of claim 1, comprising:
a data memory configured to store the unique identifier for the radio tag; and
wherein the one or more processors are configured to:
use the one or more product state sensors to determine packaging state information indicating whether the packaging is opened or unopened, and
prompt the transmitter to send the advertising data packet comprising the unique identifier and the packaging state information.

3. The radio tag of claim 2, wherein the radio tag comprises a status indicator, and wherein the one or more processors are configured to:
determine the packaging state of the packaging of the product using a sensor of the one or more product state sensors, and
prompt the status indicator to indicate the packaging state.

4. The radio tag of claim 1, wherein the radio tag comprises a status indicator, and wherein the one or more processors are configured to:
receive at least one measured value from a sensor of the one or more product state sensors,
compare the at least one measured value with a defined limit value, and,
prompt the status indicator to indicate a warning signal based on whether the measured value is below or above the defined limit value.

5. The radio tag of claim 1, wherein the radio tag comprises a receiver configured to receive a signal, wherein the radio tag comprise a status indicator, and wherein the one or more processors are configured to:
receive the signal using the receiver, and
prompt the status indicator to indicate a warning signal.

6. The radio tag of claim 1, comprising:
an optically readable code comprising the unique identifier.

* * * * *